No. 713,033. Patented Nov. 4, 1902.
S. B. WHITESIDE.
VEHICLE WHEEL.
(Application filed Aug. 2, 1902.)

(No Model.) 2 Sheets—Sheet 1.

WITNESSES,
Harry J. Perkins
Mary S. Tooker

INVENTOR
Sidney B. Whiteside
By Edward Taggart
his Attorney

No. 713,033. Patented Nov. 4, 1902.
S. B. WHITESIDE.
VEHICLE WHEEL.
Application filed Aug. 2, 1902.

(No Model.) 2 Sheets—Sheet 2.

WITNESSES
Harry J Perkins
Mary S. Tooker

INVENTOR.
Sidney B Whiteside
By his ATTORNEY.
Edward Taggart

THE NORRIS PETERS CO., PHOTO-LITHO., WASHINGTON, D. C.

UNITED STATES PATENT OFFICE.

SIDNEY B. WHITESIDE, OF GRAND RAPIDS, MICHIGAN, ASSIGNOR TO WHITE-SIDE WHEEL COMPANY, LIMITED, OF GRAND RAPIDS, MICHIGAN.

VEHICLE-WHEEL.

SPECIFICATION forming part of Letters Patent No. 713,033, dated November 4, 1902.

Application filed August 2, 1902. Serial No. 118,183. (No model.)

*To all whom it may concern:*

Be it known that I, SIDNEY B. WHITESIDE, a citizen of the United States, residing at Grand Rapids, in the county of Kent and State of Michigan, have invented new and useful Improvements in Vehicle-Wheels, of which the following is a specification.

This invention relates to vehicle-wheels, and has reference to the same general type of wheel one form of which was described in my previous application, Serial No. 93,978, filed February 8, 1902. This wheel consists of a rim and a hub, the latter in two parts movable in a circumferential direction with respect to each other, and two sets of spokes extending from the rim to the respective parts of the hub, whereby uniform tension may be put upon all the spokes and the entire wheel by rotating the two parts of the hub in opposite directions and then locking them together at a point where the desired tension is obtained.

In the present case the invention has to do with the means for locking the two parts of the hub under tension, also with the method of attaching and locking the spokes in relation with the hub, also with the means for lubricating the parts when in operation, and also with other details of construction fully described hereinafter and pointed out in the claims.

Figure 1:
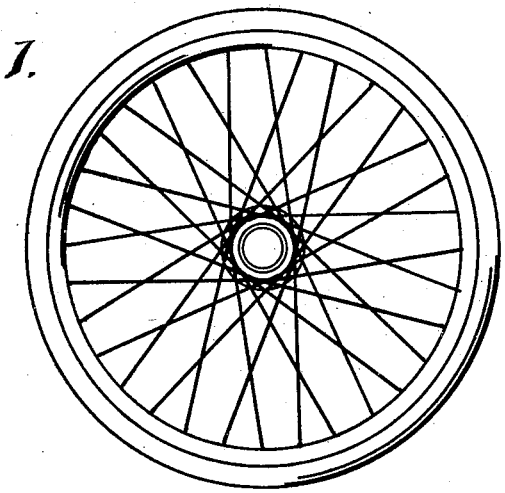
Figure 2:
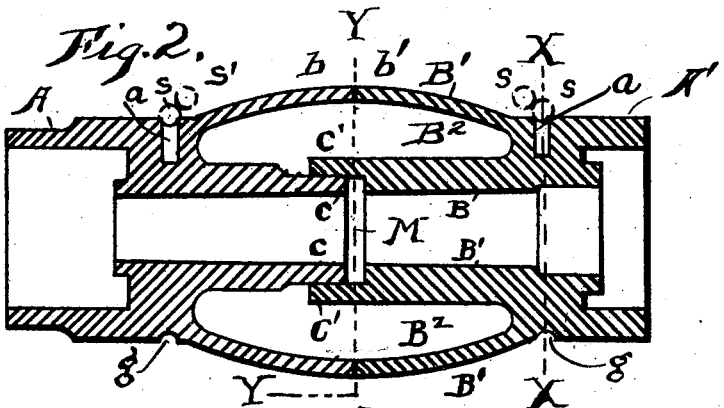
Figure 3:
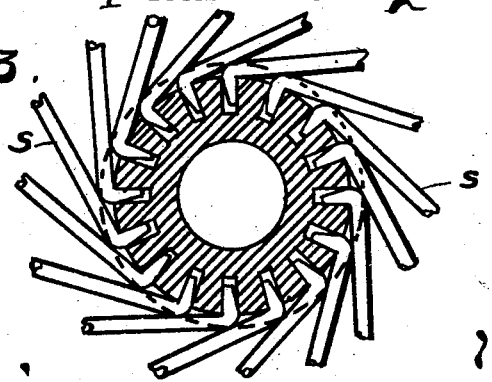
Figure 4:
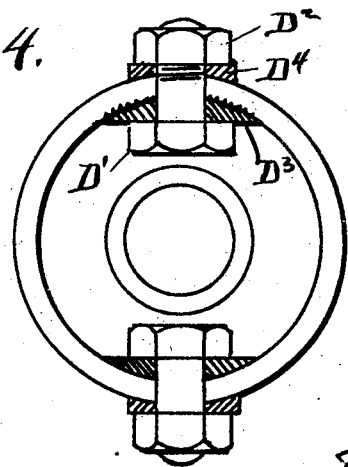
Figure 7:
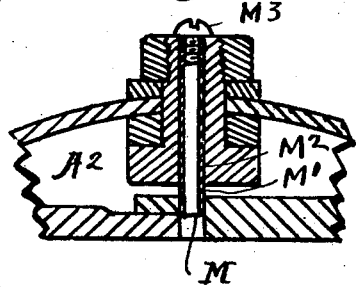
Figure 5:
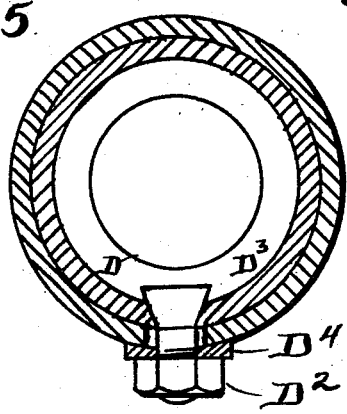
Figure 6:
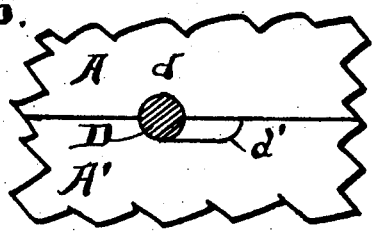

In the accompanying drawings, Figure 1 is a side elevation of the wheel, showing its general form and appearance. Fig. 2 is a section through the hub of the wheel and in the plane of its axis. Fig. 3 is a section through the hub at right angles to its axis on the line $x\,x$ of Fig. 2 and showing also in side elevation the spokes departing somewhat from that plane. Fig. 4 is a section through the hub at right angles to its axis and on the line $y\,y$ of Fig. 2, showing one form of the method of locking the two parts of the hub under tension. Fig. 5 is a section similar to Fig. 4, but showing another form of locking the parts together. Fig. 6 is an exterior plan view of a portion of the two halves of the hub, showing one method in which the binding-bolt passes through the same. Fig. 7 shows in detail the clamping and oiling device as applied to the construction shown in Fig. 2.

The hub of the wheel is divided into two parts on a plane substantially at right angles to the axis, said parts being indicated by A and A' and the line of division being substantially at the middle point of the hub, though this is not essential. Each part of the hub is provided with substantially radial holes $a$ to receive the ends of the spokes, as shown in Fig. 3, the spokes being provided with hooks for this purpose and leading from the surface of the hub to the rim in a direction approximately tangential to the hub. The spokes connected with one part of the hub lead to the rim in a direction opposite to those connected with the other part of the hub, so that when the two parts of the hub are rotated with respect to each other by means of a suitable wrench or other device a uniform tension is put upon all the spokes simultaneously.

In order to lock the two parts of the hub together after sufficient rotation to give the desired tension to the spokes and so that the parts will not resume their normal relation and release the tension, I employ a clamping device consisting, essentially, of independent clamping-surfaces upon the opposite sides of the hub and a screw-bolt for producing efficient frictional contact between the clamping-surfaces and the hub. One form of this device I have illustrated in Figs. 2 and 4. Instead of making the two parts of the hub solid I have preferred to make them hollow in the form shown in Fig. 2, thus providing upon each part of the hub the outer shell B and the inner shell B', inclosing the annular chamber B², closed at one end and open toward the center of the hub. The outer shell terminates in a bearing-surface $b'$ which comes in contact with and bears against a similar surface $b'$ upon the end of the outer shell on the other part of the hub. The inner shell I make in two parts of telescopic form with reference to each other, as shown by $c\,c$ and $c'\,c'$ in Fig. 2. By this construction the inner shell of one part of the hub enters the inner shell of the other part, thus automatically securing and maintaining the perfect axial alinement of the two halves of the hub with reference to each other.

I provide a headed screw-bolt which passes through the outer shell at the junction of the two parts of the hub. This bolt lies partly in one portion of the hub and partly in the other portion. For this purpose one part of the hub is provided with a half-hole of exactly the proper size to receive the bolt, while the other part of the hub is provided with a similar half hole, but elongated, so as to be in the nature of a slot and so as to permit the rotation of the two parts with reference to each other. This specific construction is shown in Fig. 6, in which A and A' represent the two parts of the hub. $d$ shows the half-hole in one portion of the hub, suitable to make a close fit with the bolt, and $d'$ shows the elongated half hole or slot in the other portion of the hub, and D shows in section the binding-bolt, passing through the slotted opening thus formed. This bolt D is provided with a head of suitable form D', situated upon the interior of the hub and in the open chamber $B^2$, and is provided with a nut $D^2$, situated upon the outer side of the hub. It is obvious that as this nut is screwed down into position the bolt-head and the nut will clamp between them the two adjacent portions or halves of the hub and will prevent these halves from any motion with reference to each other. To make this frictional contact most effective, I provide suitable washers, through which the binding-bolt passes, one upon the interior and one upon the exterior of the outer hub-shell. These washers are shown, the interior one by $D^3$ and the exterior one by $D^4$, in Fig. 4. The exterior washer has its outer face of shape corresponding to the inner face of the binding-nut and has its interior face of shape corresponding to the exterior of the hub—that is, its interior face will resemble the inner face of a section of a hollow cylinder. The inner washer has its inner face corresponding to the shape of the outer face of the bolt-head and its outer face corresponding to the shape of the inner face of the hub-shell—that is, its outer face will be shaped like a section of the exterior of a cylinder. For a still more efficient frictional contact the surfaces of these washers may be roughened in any suitable way and to any desired extent, as indicated by the rough contact-line between the inner washer and the cylinder in Fig. 4. These binding devices may be duplicated upon another part of the hub, as is indicated in Fig. 4. It is obvious also that the clamping may be done directly by the binding portions of the bolt or with the aid of one or both of the washers, which have been described. When the wheel has been assembled and the two parts of the hub rotated in opposite directions until the desired tension upon the spokes is obtained, the nut upon the binding-bolt is screwed down and the parts are clamped together, as described. It will be found that the entire device is thus very firm and rigid. The two portions of the hub are held in axial alinement by the telescopic construction described, and the clamping device described assists in and increases this result. The two parts are held in close contact with each other by the opposite pull of the two sets of spokes forcing each portion of the hub toward the center, and this result also is assisted and made more perfect by the clamping device described. It also performs its own distinct office of preventing the rotation of the two parts with reference to each other.

It is obvious that the two parts may be clamped together by various equivalent means, and I have shown in Fig. 5 such another form of a clamping-lock. In this form a binding-bolt with its nut and exterior washer and with the hole and slot provided in the portions of the hub are substantially the same as in the form already described; but in place of the interior washer drawn into contact with the shell by the head of the bolt I use a bolt having a beveled head, as is shown in Fig. 5, and an expansible ring surrounding the interior of the outer shell and lying in contact part with one portion of the hub and part with the other portion of the hub. The binding-bolt passes between the ends of and lies in contact with the ends of this ring. The bolt-head and the ring are indicated in Fig. 5 by the same letters, indicating the corresponding parts in Fig. 2. It is obvious that as the beveled head of the bolt is drawn outwardly by screwing up the binding-nut the ring will be expanded and throughout its circumference forced into close frictional contact with the two parts of the hub-shell, thus clamping them together with the general effect and result already described. It is obvious also that such binding-ring or other clamping device described herein can be placed in any suitable location with reference to the parts of the hub as well as in the location described and that the clamping-bolt, while most efficient if located at the point of contact between the two parts of the hub, might be located elsewhere and engage by indirect means the part with which it did not make direct contact.

I will now proceed to describe my device for making a particularly rigid and firm locking of the spokes in position with reference to the hub. At that point in the hub where the holes are bored for the reception of the hooked ends of the spokes I construct a groove surrounding the hub and of any suitable depth, but preferably of a depth about half the diameter of the wire to be used for the spokes. This construction is fully shown in Fig. 2 and is such that the holes for the reception of the hooked ends of the spokes descend into the hub from the bottom of the groove. In Fig. 2 this groove is shown by $g\ g$. In Fig. 3 the exterior line surrounding the shaded portions indicates the bottom of this groove, while the top of the groove or the main surface of the hub is indicated by the outer dotted line. The spokes are indicated by the letters S S. In Fig. 2 also the dotted lines, in connection with the groove, show the position of the spoke lying in the groove at this point and also the position at the same point of the spoke next beyond. The letter S in Fig. 2 indicates the first spoke described, and the letter S' indicates the second spoke described. These spokes, with the hooked ends, are placed in the hub and tightened in the general manner described in my previous application. It is obvious that as the wheel is tightened the upper spoke S', starting from a point upon the hub beyond the spoke S and inclined in the same degree toward the central line of the rim, will at this point lie in a plane slightly within the plane of the spoke S and, bearing down upon the spoke S, as it will do, will have a tendency to crowd the latter to one side, thus interfering in some degree with the permanence and rigidity of the attachment. The lower spoke can also be forced outwardly at this point by the application of a sufficient external force.

In my present device the lower spoke or spoke S lies in the groove, and the pressure from the upper spoke or spoke S' instead of tending to force the spoke S out of position tends to bind the same with great strength and firmness against the outer side of the groove and between this outer side of the groove and the contact-point upon the upper spoke S'. Motion in any direction is thus made practically impossible, and as the upper or binding spoke is itself thus bound at a closely-adjacent point very great rigidity and strength result. The lower spoke instead of being in rigid contact with the hub at one point only makes such contact with the hub at both the bottom and the side, and thus instead of being held only against motion in one plane is held against motion in any direction.

In assembling the wheel or in taking the same apart for necessary repairs it will be found that before the tension is put upon the spokes or after such tension is relieved one spoke does not thus bind the adjacent spoke to such an extent as to prevent easy insertion and removal.

My lubricating device is constructed as follows: That portion of the inner shell of the hub which telescopes within the corresponding part of the inner shell of the other part of the hub is made slightly shorter than the corresponding part of the outer shell of the same part of the hub. The inner shell of the other portion of the hub—that which forms the outer part of the telescoping connection—has its interior surface shouldered or cut way back to a point farther than necessary to permit a complete telescoping connection and to a point beyond or outside of the center of the hub. The result of this construction is to produce an annular chamber upon the inner surface of the hub and surrounding the box, which chamber lies between the two portions of the hub and is shown in Fig. 2 by the letter M. This chamber is designed for the reception or holding of the oil or other lubricant suitable for applying to the bearing-surfaces of the axle and box. I find the working of the device more successful if I fill this chamber with wicking or with any suitable absorbent material. Through the center of the binding-bolt, as well as through the head thereof and through the corresponding point in the inner shell of that portion of the hub, I construct an opening for the insertion of the oil. This opening I have shown in Fig. 7 by M'. In many cases it might be desirable that the oil should not enter the hollow chamber $A^2$, and when I desire to prevent this I insert through the opening M' the tube $M^2$, communicating at one end with the exterior and at the other end with the annular chamber M. The other end of this opening M', I close by the screw-cap $M^3$ or by any suitable and common means. By this device oil or other lubricant can be applied to the bearing-surfaces of the axle and the box without taking the wheel out of position and without removing or displacing any of the parts, and this construction will provide and carry a sufficient amount of oil for considerable use under ordinary conditions. If for any reason it is desirable to increase the amount of oil which can be supplied at one time, it is obvious that by omitting the tube $M^2$ the hollow chamber $A^2$ will become a reservoir, which would hold and gradually supply to the bearing parts a large amount of oil.

In the construction of wheel which I have shown the hollow portion of one part of the hub, being the portion lying between the inner shell of the hub surrounding the axle and the outer shell, to which the spokes are attached, will register with the corresponding hollow opening in the other part of the hub, and the two together thus registering will form the hollow chamber $B^2$ shown in the drawings. This construction permits clamping or locking mechanism to be applied very effectively to the two parts of the hub, since the head of the clamping-bolt or some portion of the clamping or locking means can be contained in this hollow chamber and engage conveniently and effectively with both parts of the hub. This capacity to have a portion of the locking mechanism contained in and carried by the hollow interior of the hub I consider to be a valuable feature of my invention, and it is obvious that this general feature may be employed in a variety of forms.

I am aware that hubs have been made in two parts adapted to be rotated in a circumferential direction with reference to each other and the two parts engaging by means of intermeshing teeth upon the respective parts of the hub. This construction, however, does not permit of any more exact adjustment than is afforded by the width of the teeth, and a less adjustment than the width of the teeth cannot be made, and I have also found that after the parts have been separated sufficiently to permit the ends of the intermeshing teeth to pass each other the drawing of the parts together again for the length of the teeth relieves the tension upon the spokes and largely defeats the purpose of the device. By my invention the two parts of the hub can be given any exact adjustment that may be desired in order to put precisely the proper tension upon the spokes, and this exact adjustment may then be permanently maintained by applying the locking or clamping mechanism without the necessity of employing a greater or less tension than is desirable in order to reach the next point of adjustment and without moving the parts of the hub from and toward each other during the adjustment, and thereby varying and making inexact the tension applied to the spokes.

Having thus described my invention, what I claim to have invented, and desire to secure by Letters Patent, is—

1. In a wheel the combination of a rim, a hub in two parts separated on a plane substantially transverse to the axis, two sets of spokes extending from the rim to the respective parts of the hub, means whereby said parts may be adjusted in a circumferential direction with respect to each other, means for locking said parts in any desired relation, means whereby each spoke will bind against and lock the adjacent spoke between itself at one point and the hub at two points, and prevent motion in any direction.

2. In a wheel the combination of a rim, a hub in two parts separated on a plane substantially transverse to the axis, two sets of spokes extending from the rim to the respective parts of the hub, means whereby said parts may be adjusted in a circumferential direction with respect to each other, means for locking said parts in any desired relation, and a groove in the exterior surface of the hub at the point of spoke attachment whereby each spoke is locked and bound between such groove and the adjacent spoke.

3. In a wheel the combination of a rim, a hub in two parts separated on a plane substantially transverse to the axis, two sets of spokes extending from the rim to the respective parts of the hub, means whereby said parts may be adjusted in a circumferential direction with respect to each other, means for locking said parts in any desired relation, an annular chamber upon the interior surface of the hub, such chamber formed between the two portions of the hub, and an opening communicating between such chamber and the exterior, such opening and chamber designed for the reception and holding of a lubricant, and such opening closed at the exterior by any suitable means.

4. In a wheel the combination of a rim, a hub in two parts separated on a plane substantially transverse to the axis, two sets of spokes extending from the rim to the respective parts of the hub, means whereby said parts may be adjusted in a circumferential direction with respect to each other, means for locking said part in any desired relation, an annular chamber upon the interior surface of the hub formed between the end of the interior portion of the telescoping connection between the two parts of the hub and a shoulder upon the inner side of the exterior portion of the telescoping connection, an opening communicating between such annular chamber and the exterior surface of the hub, such opening being closed at the exterior by any suitable means, and such opening and chamber being suitable for the reception of oil or other lubricant.

5. In a wheel the combination of a rim, a hub in two parts separated on a plane substantially transverse to the axis, two sets of spokes extending from the rim to the respective parts of the hub, means whereby said parts may be adjusted in a circumferential direction with respect to each other, and a clamping-bolt passing from the interior to the exterior of the hub and engaging both parts and locking the two parts in any desired related position, said bolt being provided upon the interior surface of the hub with a washer of shape corresponding to the shape of the hub and adapted to make efficient frictional contact between the clamping-bolt and the hub.

6. In a wheel the combination of a rim, a hub in two parts separated on a plane substantially transverse to the axis, two sets of spokes extending from the rim to the respective parts of the hub, means whereby said parts may be adjusted in a circumferential direction with respect to each other, and a clamping-bolt passing from the interior to the exterior of the hub and engaging both parts and locking the two parts in any desired position, the said bolt being provided with washers upon the exterior and interior surfaces of the hub of shape similar to the hub-surfaces with which the washers contact, and adapted to make efficient frictional contact between the clamping-bolt and the two parts of the hub.

7. In a wheel the combination of a rim, a hub in two parts separated on a plane substantially transverse to the axis, two sets of spokes extending from the rim to the respective parts of the hub, means whereby said parts may be adjusted in a circumferential direction with respect to each other and a clamping-bolt passing from the interior to the exterior of the hub and engaging both parts at their point of contact and locking the two parts in any desired related position, one part of the hub being provided with an opening or hole for the reception of a portion of the clamping-bolt and the other part of the hub being provided with a slot for the reception of the remainder of the clamping-bolt.

8. In a wheel the combination of a rim, a hub in two parts separated on a plane substantially transverse to the axis, two sets of spokes extending from the rim to the respective parts of the hub, means whereby said parts may be adjusted in a circumferential direction with respect to each other, means for locking the same in any desired relation, each part composed of an exterior and an interior shell containing a hollow chamber registering with a similar chamber in the other part and containing a portion of the locking mechanism.

9. In a wheel, the combination of a rim, a hub made up of two parts, said parts being so constructed as to provide an annular chamber in said hub, a set of spokes extending from each part of the hub to the rim, means for adjusting the two parts of the hub in a circumferential direction with respect to each other, and means for locking said parts together, part of said locking means being located in said annular chamber.

In testimony whereof I have hereunto set my hand in presence of two subscribing witnesses.

SIDNEY B. WHITESIDE.

Witnesses:
ARTHUR C. DENISON,
MARY S. TOOKER.